United States Patent [19]
Brooks et al.

[11] Patent Number: 5,806,958
[45] Date of Patent: *Sep. 15, 1998

[54] AUTOMOTIVE HEADLAMP ADJUSTMENT ASSEMBLY VIEWING WINDOW

[75] Inventors: Gary Brooks, Scipio; Kevin Wyatt, Seymour, both of Ind.

[73] Assignee: Osram Sylvania Inc., Danvers, Mass.

[*] Notice: The terminal 8 months of this patent has been disclaimed.

[21] Appl. No.: 387,999

[22] Filed: Feb. 13, 1995

[51] Int. Cl.$^6$ .............................. B60Q 1/04; F21M 3/20
[52] U.S. Cl. .............................................. 362/66; 362/326
[58] Field of Search ............................ 362/66, 287, 311, 362/326, 330, 333, 334, 338, 419, 427, 61

[56] References Cited

U.S. PATENT DOCUMENTS

| | | | |
|---|---|---|---|
| 5,031,081 | 7/1991 | Daumueller et al. | 362/66 |
| 5,253,154 | 10/1993 | McMahan et al. | 362/427 |
| 5,317,486 | 5/1994 | Schmitt | 362/419 |
| 5,359,499 | 10/1994 | Denley | 362/66 |

*Primary Examiner*—Y. My Quach

[57] ABSTRACT

There is presented an automotive headlamp adjustment assembly viewing window, the window comprising a plate of rigid material, the plate having a transparent central portion, and a prism integral with the transparent portion of the window and extending from a bottom surface thereof, beyond the remainder of the window.

12 Claims, 6 Drawing Sheets

AUTOMOTIVE HEADLAMP ADJUSTMENT ASSEMBLY VIEWING WINDOW

BACKGROUND OF THE INVENTION

1. Field of the Invention

This invention relates to adjustment assemblies for adjusting vertically and horizontally the aim of automotive headlamps, and is directed more particularly to a window portion of such an assembly, which window portion facilitates an operator's viewing of the position of an associated headlamp reflector in its housing and facilitates use of the assembly to correctly set the aim of the associated headlamp reflector.

2. Description of the Prior Art

It is well known in the automotive headlamp arts to provide an adjustment assembly by which headlamps may be adjusted vertically and horizontally within their housing. Such adjustment assemblies typically are incorporated in the headlamp assemblies and serve as a means for positioning the headlamp for the life of the headlamp.

As may be seen in FIG. 1, each headlamp 20 of an automotive vehicle 22 must be positioned, or "aimed" vertically, as indicated by arrows 24, and horizontally, as indicated by arrows 26, relative to a central reference axis 28. While the headlamps are accurately positioned before shipment from the factory, ordinary wear and usage, as well as traumatic events, can and do lead to displacement of the headlamp beam from the central reference axis.

Referring to FIG. 2, it will be seen that one such adjustment assembly 30 is incorporated in a headlamp assembly 32 including a housing 34 in which is disposed a reflector 36. The housing 34 includes a body portion 38 and a lens 40. The body portion 38 is retained in the engine compartment of the vehicle 22, while the headlamp lens 40 extends to, and is exposed on, an outside surface of the vehicle. The headlamp adjustment assembly 30 includes a vertical adjustment device and a horizontal adjustment device (not shown) by which usually the reflector is moved. The headlamp assembly 32 includes a light source 42 which may be moved by the adjustment devices, but generally it is preferable to leave the light source 42 in a permanent position and move the reflector 36 thereabout.

In U.S. Pat. No. 5,317,486, issued May 31, 1994, to Karl R. Schmitt, there is shown and described a headlamp assembly, complete with adjustment assembly, of the type shown in FIGS. 1–4 herein.

In FIGS. 2–4 there is shown a headlamp calibration assembly 44 of the type discussed in the '486 patent. The headlamp calibration assembly 44 includes a viewing window 46 disposed over a viewing port 48 formed in the housing body portion 38. The calibration assembly 44 further includes a horizontal position indicating means 50 mounted on an arm 52 extending from the reflector 36, and a vertical position indicating means 54, usually in the form of a bubble level, also mounted on the arm 52.

As may be seen in FIGS. 4 and 5, the horizontal and vertical position indicating means 50, 54 are visible through the viewing window 46. To aid in viewing horizontal position lines 56 on the horizontal position indicating means 50, the viewing window 46 is provided with a magnifying lens portion 60 formed integrally with the window 46 and having sighting line grooves 62 in upper and lower convex surfaces 64, 66 of the lens portion 60. The correct horizontal azimuth is said to be obtained when one of the horizontal position lines 56 is observed by an operator to be midway between, and parallel to, the sighting line grooves 62, as shown in FIG. 4.

So that an adjustment assembly 30 may be suited for use on either right side or left side headlamps, each horizontal position indicating means 50 includes two sets of horizontal position lines 56 and 56a, and the viewing window 46 includes two substantially identical lens portions 60 and 60a. The window 46 is rotatably mounted by peripheral slots 68 having therein fasteners 70 which may be tightened down to lock the window in place. A lever 72 is provided by which to turn the window 46 to accommodate either left or right headlamp assemblies.

The structure and operation of the device above described, and shown in FIGS. 1–5 herein, is shown and described in greater detail in the aforementioned '486 patent.

While the above-described adjustment structure is directed toward accurate and easy alignments, in practice it has been found wanting. It is believed to be often inaccurate because the relatively large distance, some fifteen millimeters, or thereabouts, between the lens and the horizontal calibration lines permits a parallax reading. A reflector misalignment of a millimeter, or so, causes a substantial misalignment of a projected beam at a range of 300 feet.

Accordingly, there is a need for a headlamp adjustment assembly viewing window which insures accurate observations of horizontal position indicating lines on the horizontal position indicating means of the calibration assembly, and which is inexpensive, reliable, and which is compatible with the hereinabove described adjustment assembly.

SUMMARY OF THE INVENTION

An object of the invention is to provide an improved viewing window for an automotive headlamp adjustment assembly, which window provides more accurate observation of the headlamp reflector horizontal position relative to a stationary headlamp housing, and therefore more accurate positioning of the reflector in the housing, to provide a more accurately aimed beam of light from the headlamp reflector.

A further object of the invention is to provide such a viewing window as is compatible with current headlamp adjustment assemblies and can be substituted for a current viewing window without the need of modifying other parts of the adjustment assembly.

A still further object of the invention is to provide such a viewing window as is easily and inexpensively manufactured, is reliable and easy to use.

With the above and other objects in view, as will hereinafter appear, a feature of the present invention is the provision of an automotive headlamp adjustment assembly viewing window, the window comprising a plate of rigid material, the plate having a transparent central portion, and a prism integral with the transparent portion of the plate and extending from a bottom surface thereof beyond the remainder of the window.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
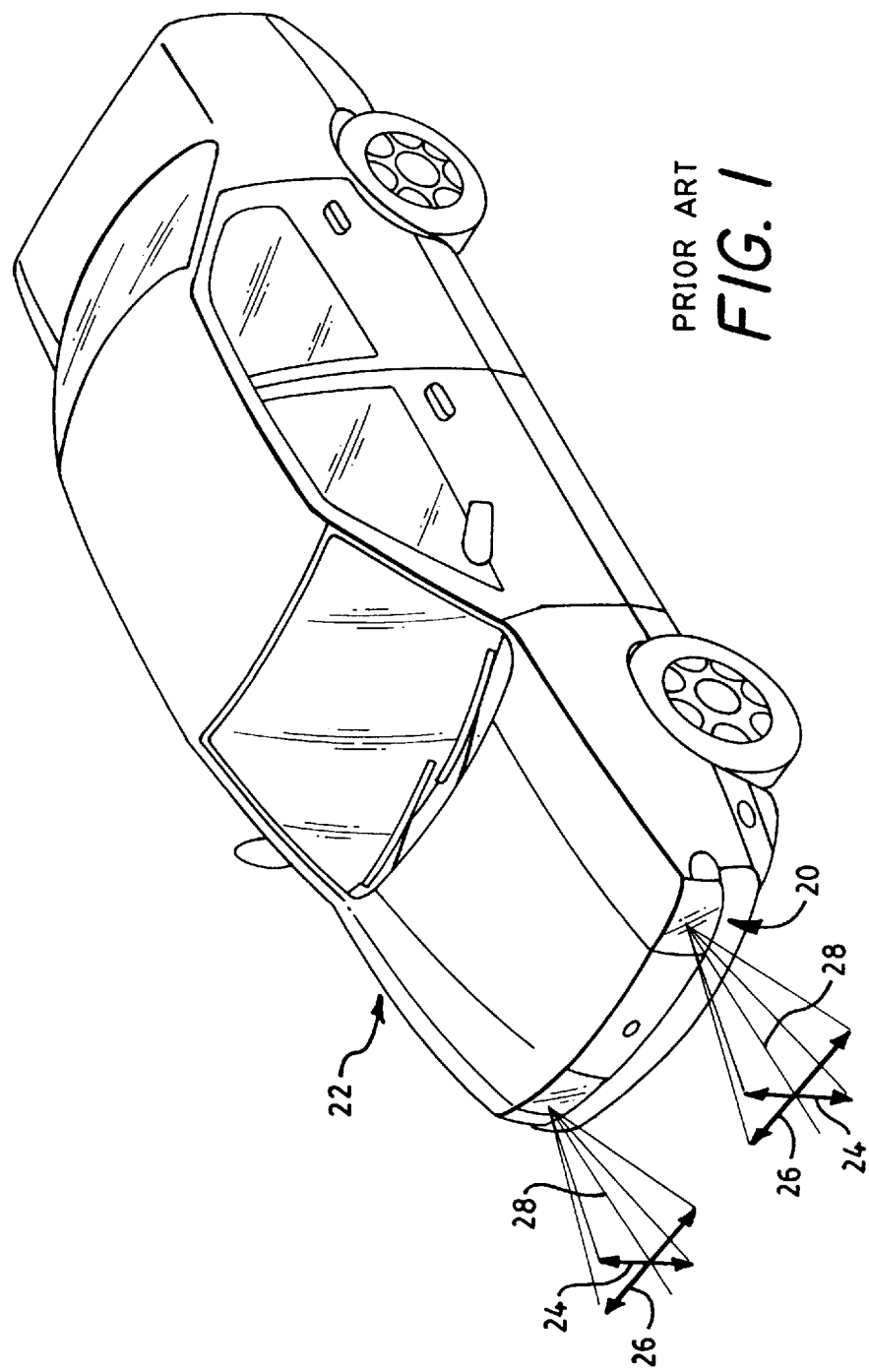
FIG. 1 is a perspective view in which there is illustrated diagrammatically vertical and horizontal adjustment of an automotive headlamp assembly.
Figure 2:
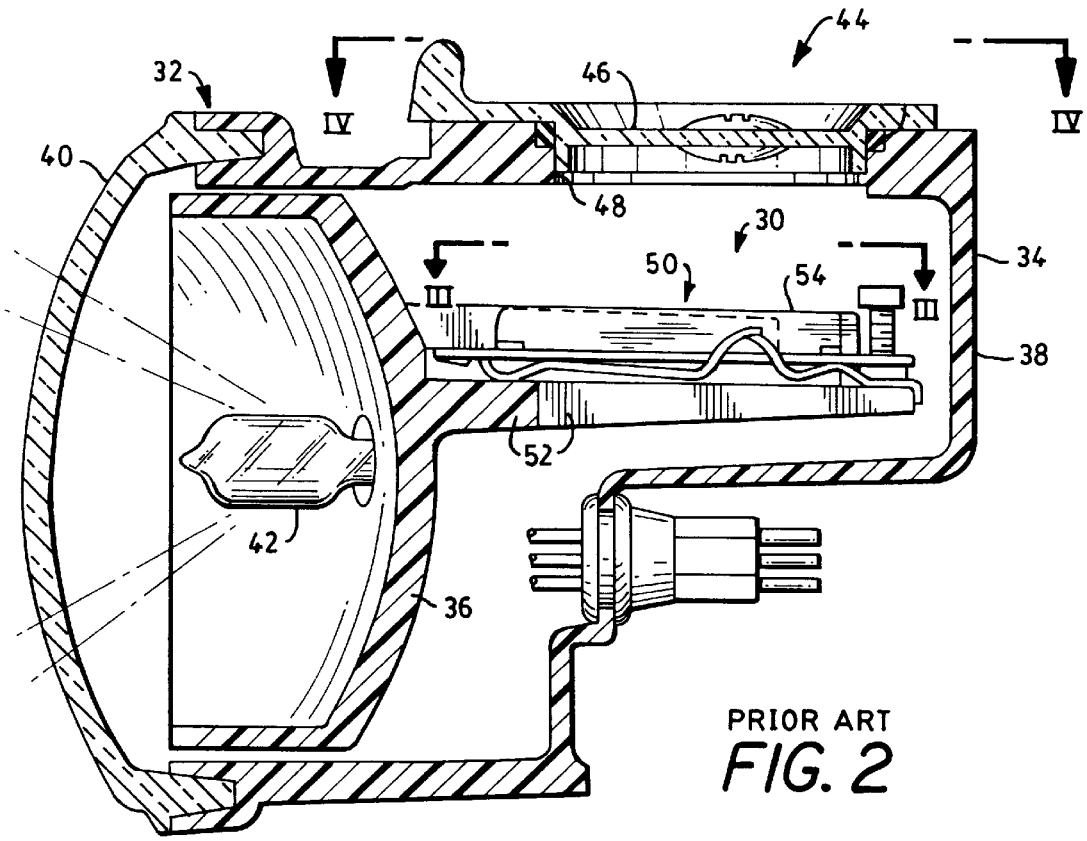
FIG. 2 is a generally sectional view of a headlamp assembly with adjustment components therein.
Figure 3:
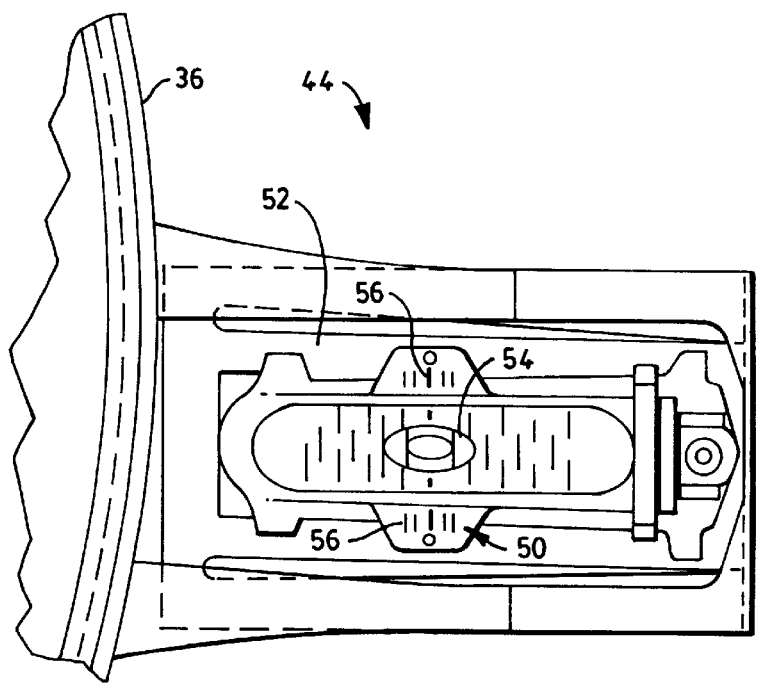
FIG. 3 is a top plan view of a portion of the assembly of FIG. 2, taken along line III—III of FIG. 2.

Referring to FIGS. 6–9, it will be seen that the illustrative viewing window comprises a plate 80 of rigid transparent material, such as glass, polycarbonate, or the like. Outer portions 82 of the plate 80 may be frosted, but a central portion 84 of the plate is transparent, allowing viewing therethrough into the headlamp housing 34. Upper and bottom surfaces 86, 88 (FIG. 9) of the transparent central portion 84 of the plate 80 are co-planar.

Figure 10:
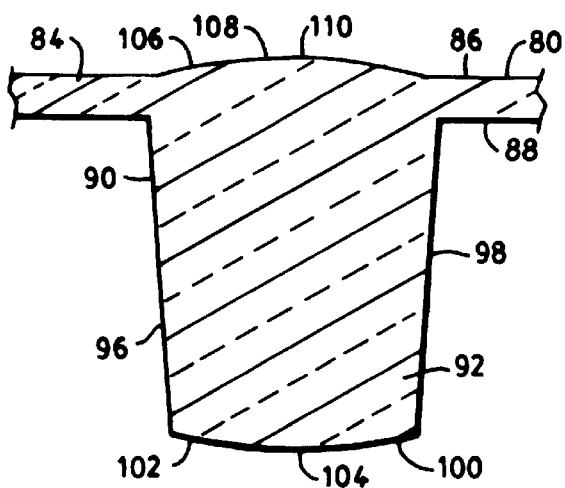
FIG. 10 is a front elevational view of a prism portion of the viewing window of FIGS. 6–9.
Figure 11:
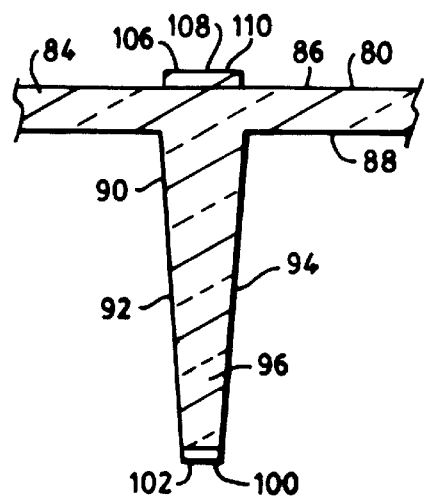
FIG. 11 is a side elevational view of the prism portion of FIG. 10.

A first prism 90 extends from the bottom surface 88 in a direction generally normal to the bottom surface. As may be seen in FIGS. 10 and 11, the prism 90 is provided with four side walls, including a front wall 92, a rear wall 94, and side edge walls 96, 98. The front wall 92, rear wall 94 and side edge walls 96, 98 preferably are frosted to allow light to enter the prism therethrough to light the scene of view, but to diffuse such light to diminish reflections or the appearance of other images in the field of view.

A free end 100 of the prism 90 forms a lower end lens 102 and is curved to provide a convex configuration 104 for focusing images adjacent the free end 100 into the prism 90.

Similarly, on the upper surface 86 of the plate 80 is disposed an upper lens 106 having a curved raised portion 108 of convex configuration 110. The raised portion 108 is aligned with the prism 90 and is adapted to project images from the lower end lens 102 to an eye of a viewer peering into the upper lens 106.

In practice, it has been found appropriate that the prism 90 be about 14 mm in length from the plate bottom surface 88, and that the convex configuration 104, 110 be defined by circular arcs of about 2 cm radius. In cross-section, at the juncture with the plate bottom surface 88, the prism preferably is about 12 mm×3 mm, and at the free end thereof is about 11 mm×2 mm. Thus, the front, rear, and side edge walls 92, 94, 96 and 98, taper inwardly from the plate bottom surface 88 to the free end 100 thereof.

Figure 4:
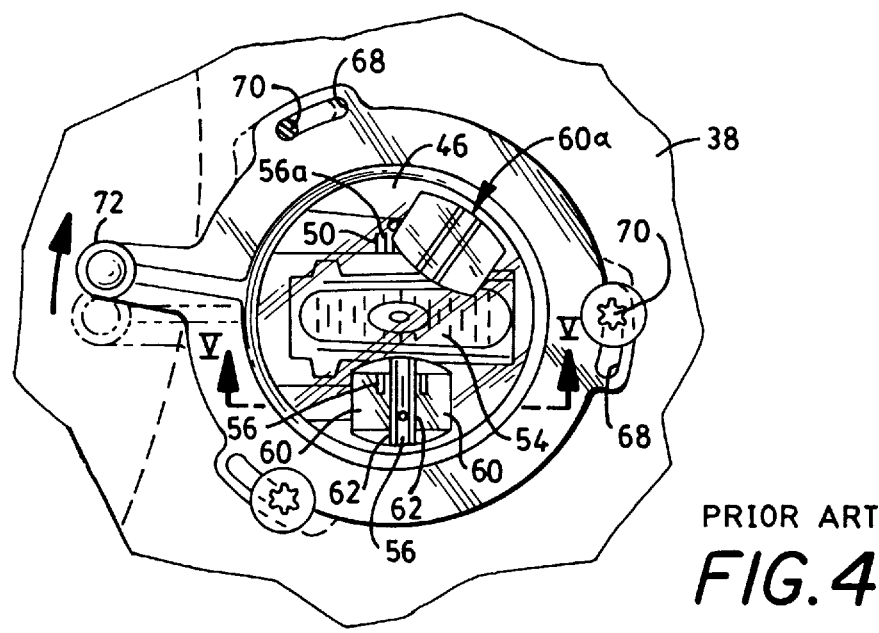
FIG. 4 is a top plan view of a portion of the assembly of FIG. 2, taken along line IV—IV of FIG. 2.
Figure 8:
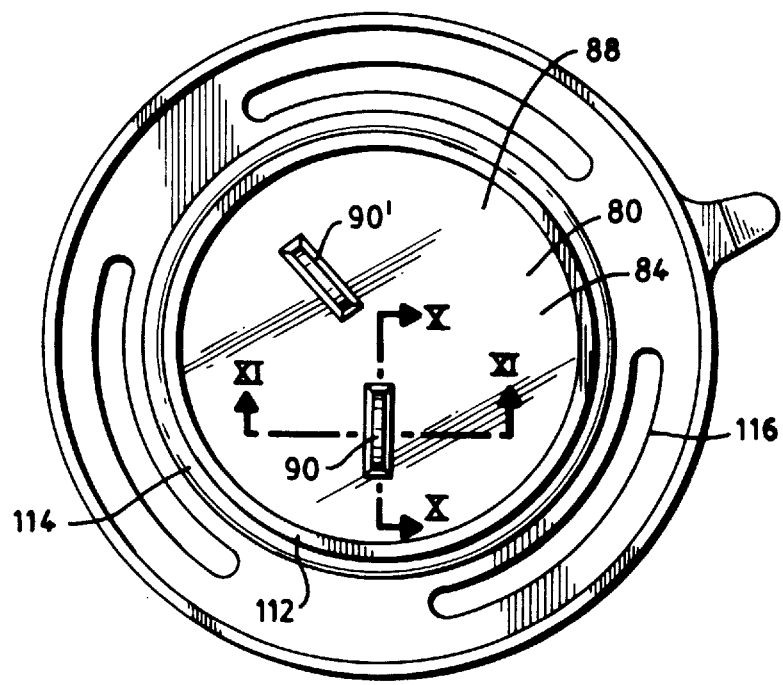
FIG. 8 is a bottom view thereof.
Figure 9:
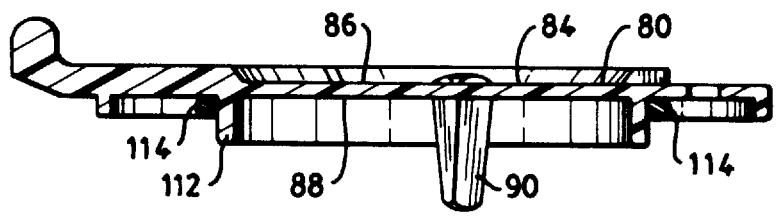
FIG. 9 is a side elevational view thereof.

As may be seen in FIGS. 8 and 9, a circular wall 112 depends from the plate bottom surface 88 and supports a sealing ring 114 (FIG. 9) for effecting a seal between the plate 80 and the headlamp housing 34. The plate 80 preferably includes a coupling region 116 having therein a plurality of slide slots 118 for receiving screws 70, as shown in FIG. 4. The screws 70 comprise locking means by which the plate 80 is locked in place on the headlamp housing 34. In assembly at the factory, the housing 34 and plate 80 are aligned by rotating the plate. Once the plate is properly aligned, the screws 70 are advanced in their respective holes to clamp the edges of the slots 118 to the housing 34, thereby locking the viewing window in place with the lower lens 102 adjacent the proper horizontal position line 56.

Upon displacement of the headlamp reflector 36, the reflector, and therefore the projected beam, may be brought back into proper alignment by adjusting the reflector 36 until the appropriate line 56 is aligned under the lower lens 102.

The viewing window herein disclosed is molded as an integral one-piece unit to which is added only the sealing ring 114 and the improved window is ready for attachment to a headlamp assembly 32.

Figure 5:
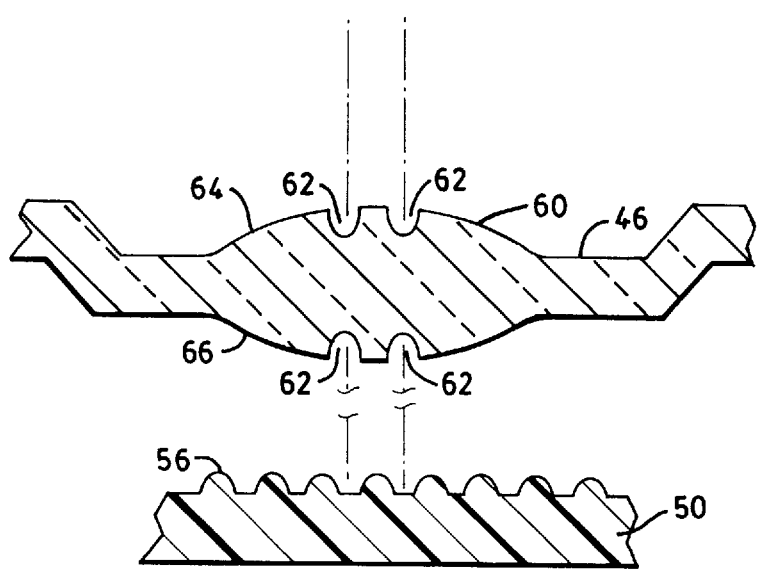
FIG. 5 is a sectional view taken along line V—V of FIG. 4.
Figure 12:
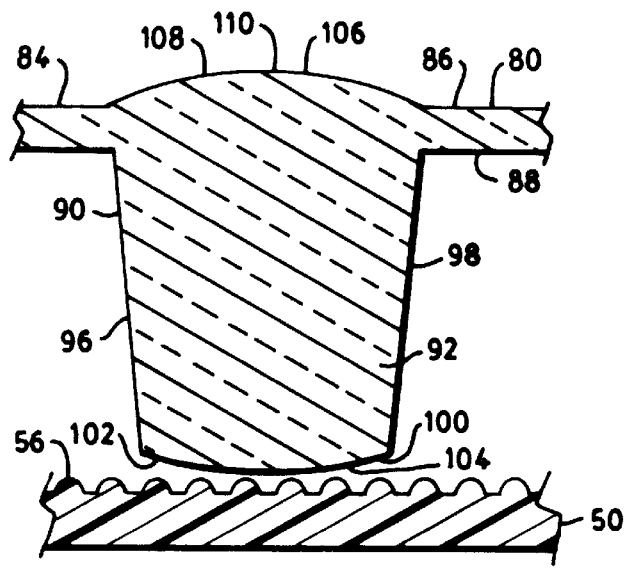
FIG. 12 is similar to FIG. 5, but illustrative of the improved feature of the viewing window of FIGS. 6–11.

In use, the lower lens 102 is positioned adjacent to the horizontal position line 56, as shown in FIG. 12, virtually eliminating the paralax problems associated with the prior art viewing window (FIG. 5).

Figure 6:
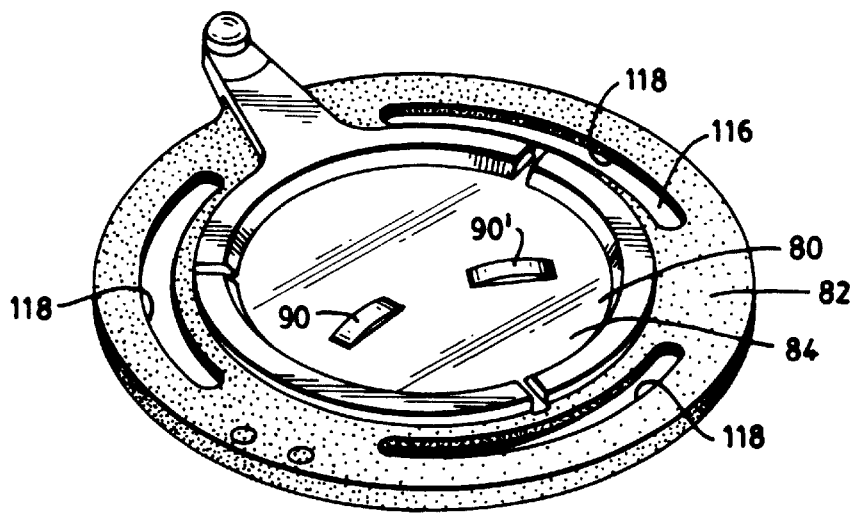
FIG. 6 is a perspective view of one form of headlamp adjustment assembly viewing window illustrative of an embodiment of the invention.
Figure 7:
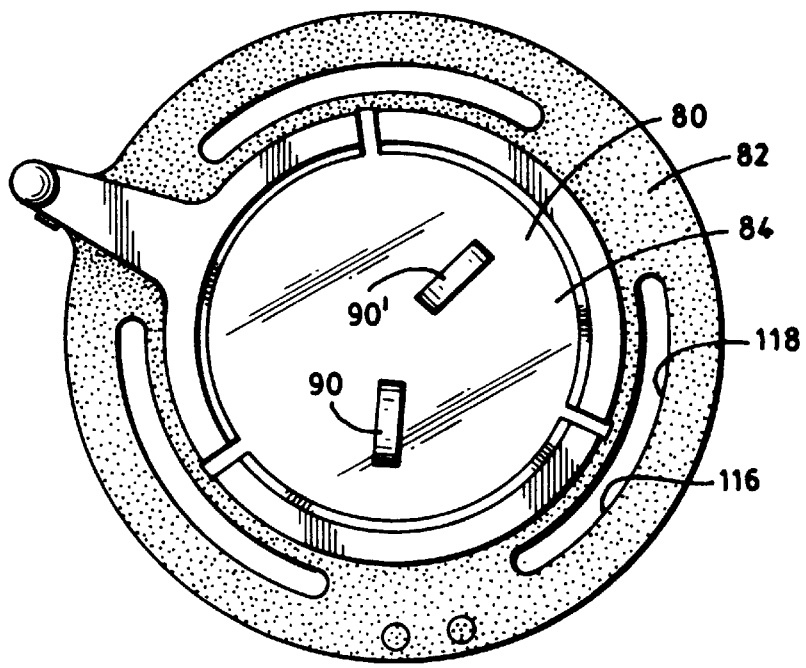
FIG. 7 is a top plan view of the viewing window of FIG. 6.

Inasmuch as the viewing window is made so as to be suitable for either right side or left side headlamps, there is provided on each window a second prism 90' substantially identical to the aforementioned first prism 90, differing only in its position on the window, as shown in FIGS. 6–8.

Thus, there is provided an improved viewing window which provides more accurate positioning of headlamp reflectors and, therefore, more accurate aiming of headlamp beams, is compatible with prior art headlamp adjustment assemblies and can be substituted for prior art viewing windows without modification of other parts, and is easily and inexpensively manufactured, and is reliable and easy to use.

It is understood that the present invention is by no means limited to the particular construction herein disclosed and/or shown in the drawings, but also comprises any modifications or equivalents within the scope of the claims.

Having thus disclosed our invention, what we claim as new and desire to secure by Letters of Patent of the United States is:

1. An automotive headlamp adjustment assembly viewing window, for viewing from an exterior side of a headlamp, a position indicator located in an interior portion of the headlamp, said window comprising:

a coupling providing a seal between the exterior side of the headlamp, and the interior portion of the headlamp, a plate supported by the coupling, the plate being of rigid material, said plate having a transparent portion, with an exterior surface and an interior surface; and a first viewing prism integral with said transparent portion of said plate and extending from the interior surface thereof into the interior portion of the headlamp beyond any portion of said coupling in a direction toward the position indicator.

2. The window in accordance with claim 1 wherein said interior surface of said transparent portion of said plate is substantially planar.

3. An automotive headlamp adjustment assembly viewing window, for viewing from an exterior side of a headlamp a position indicator located in an interior portion of the headlamp, said window comprising:

a plate of rigid material, said plate having a transparent portion, with an exterior surface and an interior surface; and a first viewing prism integral with said transparent portion of said plate and extending from the interior surface thereof into the interior portion of the headlamp beyond any other portion of said window, and wherein said prism extends from said interior surface of said transparent portion of said plate in a direction generally normal to said interior surface in a direction toward the position indicator and wherein side walls of said prism are frosted.

4. The window in accordance with claim 3 wherein said side walls include front, rear and side edge walls.

5. The window in accordance with claim 3 wherein a free end of said prism forms a lower end lens and is curved to provide a convex configuration for focusing images adjacent said free end into said prism.

6. The window in accordance with claim 5 wherein on a top surface of said plate is disposed an upper lens comprising a curved raised portion of convex configuration, said raised portion being aligned with said prism and adapted to project images from said lower end lens to an eye of a viewer.

7. An automotive headlamp adjustment assembly viewing window, for viewing from an exterior side of a headlamp a position indicator located in an interior portion of the headlamp, said window comprising:

a plate of rigid material, said plate having a transparent portion, with an exterior surface and an interior surface; and a first viewing prism integral with said transparent portion of said plate and extending from the interior surface thereof into the interior portion of the headlamp beyond any other portion of said window, wherein said interior surface of said transparent portion of said plate is substantially planar, and wherein said prism extends from said interior surface of said transparent portion of said plate in a direction generally normal to said interior surface in a direction toward the position indicator wherein portions of said plate around said prism are frosted.

8. An automotive headlamp adjustment assembly viewing window, for viewing from an exterior side of a headlamp a position indicator located in an interior portion of the headlamp, said window comprising:

a plate of rigid material, said plate having a transparent portion, with an exterior surface and an interior surface; and a first viewing prism integral with said transparent portion of said plate and extending from the interior surface thereof into the interior portion of the headlamp beyond any other portion of said window, wherein said interior surface of said transparent portion of said plate is substantially planar, and wherein said prism extends from said interior surface of said transparent portion of said plate in a direction generally normal to said interior surface in a direction toward the position indicator, and includes frosted front, rear and side edge walls, wherein said front, rear and side edge walls taper inwardly from said interior surface to a free end of said prism.

9. An automotive headlamp adjustment assembly viewing window, for viewing from an exterior side of a headlamp a position indicator located in an interior portion of the headlamp, said window comprising:

a coupling providing a seal between the exterior side of the headlamp, and the interior portion of the headlamp, a plate supported in the coupling, the plate being of rigid material, said plate having a transparent portion, with an exterior surface and an interior surface; and a first prism integral with said transparent portion of said plate and extending from the interior surface thereof into the interior portion of the headlamp beyond any other portion of said window, in a direction toward the position indicator and wherein said transparent portion further includes a second prism integral with said transparent portion and extending from said interior surface of said transparent portion a distance equal to the distance to which said first prism extends, said second prism being substantially identical to said first prism and spaced therefrom.

10. An automotive headlamp adjustment assembly viewing window, for viewing from an exterior side of a headlamp a position indicator located in an interior portion of the headlamp, said window comprising:

a coupling providing a seal between the exterior side of the headlamp, and the interior portion of the headlamp, a plate supported in the coupling, the plate being of rigid material, said plate having a transparent portion, with an exterior surface and an interior surface; and a first viewing alignment structure integral with said transparent portion of said plate and extending from the interior surface thereof into the interior portion of the headlamp beyond any portion of said coupling in a direction toward the position indicator thereby limiting view of the position indicator to a range allowing substantially only proper reading of the indicator.

11. An automotive headlamp adjustment assembly viewing window, for viewing from an exterior side of a headlamp, a position indicator located in an interior portion of the headlamp, said window comprising:

a coupling providing a seal between the exterior side of the headlamp, and the interior portion of the headlamp, a plate supported in the coupling, the plate being of rigid material, said plate having a transparent portion, with an exterior surface and an interior surface; and a first viewing prism integral with said transparent portion of said plate, and having a first distance parallel, and adjacent to the plate, the prism extending from the interior surface of the plate into the interior portion of the headlamp in a direction toward the position indicator with a second distance, the first distance being less than the second distance.

12. The window in accordance with claim 11 wherein the ratio of said first distance to said second distance is about three fourteenths.

* * * * *